US011251821B1

(12) United States Patent
Woods et al.

(10) Patent No.: US 11,251,821 B1
(45) Date of Patent: Feb. 15, 2022

(54) CLICK NOISE EXCISION

(71) Applicant: Rockwell Collins, Inc., Cedar Rapids, IA (US)

(72) Inventors: Matthew Woods, Ottawa (CA); Kenneth W. Moreland, Kemptville (CA); Mark B. Jorgenson, Kanata (CA); Scott Klassen, Kanata (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/246,138

(22) Filed: Apr. 30, 2021

(51) Int. Cl.
*H04B 1/10* (2006.01)
*H04B 17/26* (2015.01)
*H04L 27/14* (2006.01)

(52) U.S. Cl.
CPC .......... *H04B 1/1027* (2013.01); *H04B 17/26* (2015.01); *H04L 27/14* (2013.01)

(58) Field of Classification Search
CPC .......... H04B 1/06; H04B 1/10; H04B 1/1027; H04B 1/109; H04B 17/20; H04B 17/26; H04B 17/318; H04L 27/14
See application file for complete search history.

(56) References Cited

U.S. PATENT DOCUMENTS

| 3,588,705 | A | * | 6/1971 | Paine | H03G 3/345 |
| | | | | | 455/212 |
| 5,894,593 | A | * | 4/1999 | Cadd | H04L 27/0012 |
| | | | | | 455/254 |
| 6,032,048 | A | | 2/2000 | Hartless et al. | |
| 8,073,079 | B1 | * | 12/2011 | Ahmed | H04L 27/2275 |
| | | | | | 375/324 |
| 8,855,252 | B2 | * | 10/2014 | Siemons | H04B 1/1081 |
| | | | | | 375/346 |
| 8,861,584 | B2 | | 10/2014 | Brown et al. | |
| 2012/0121037 | A1 | * | 5/2012 | Popescu | H03G 3/348 |
| | | | | | 375/296 |

FOREIGN PATENT DOCUMENTS

EP 2487801 B1 9/2018

\* cited by examiner

*Primary Examiner* — Siu M Lee
(74) *Attorney, Agent, or Firm* — Suiter Swantz pc llo

(57) ABSTRACT

A radio receiver system configured to remove click noise from a demodulated signal is disclosed. The radio receiver system may employ digital demodulation or analog demodulation. The radio receiver system may be configured to determine measures of a statistical distribution of amplitudes of the demodulated signal, and thresholds for limiting the demodulated signal based on the measures of the statistical distribution of amplitudes. Portions of the demodulated signal exceeding the thresholds are either soft limited or hard limited.

19 Claims, 4 Drawing Sheets

CLICK NOISE EXCISION

SUMMARY

A radio receiver system is disclosed in accordance with one or more illustrative embodiments of the present disclosure. In one illustrative embodiment, the radio receiver system comprises one or more antenna elements configured to receive an incoming frequency modulated (FM) signal. In another illustrative embodiment, the radio receiver system comprises a controller including one or more processors configured to execute program instructions causing the one or more processors to: demodulate the incoming FM signal to generate a demodulated signal; determine measures of a statistical distribution of amplitudes of the demodulated signal; determine thresholds for limiting the amplitudes of the demodulated signal based on the measures; and responsive to portions of the amplitudes exceeding the thresholds, limit the portions of the amplitudes from the demodulated signal.

A radio receiver system is disclosed in accordance with one or more illustrative embodiments of the present disclosure. In one illustrative embodiment, the radio receiver system comprises one or more antenna elements configured to receive an incoming frequency modulated (FM) signal. In another illustrative embodiment, the radio receiver system comprises an analog FM demodulator configured to demodulate the incoming FM signal and generate a demodulated output signal. In another illustrative embodiment, the radio receiver system comprises a controller including one or more processors configured to execute program instructions causing the one or more processors to: determine measures of a statistical distribution of amplitudes of the demodulated signal; determine thresholds for limiting the amplitudes of the demodulated signal based on the measures; and responsive to portions of the amplitudes exceeding the thresholds, limit the portions of the amplitudes from the demodulated signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1A:
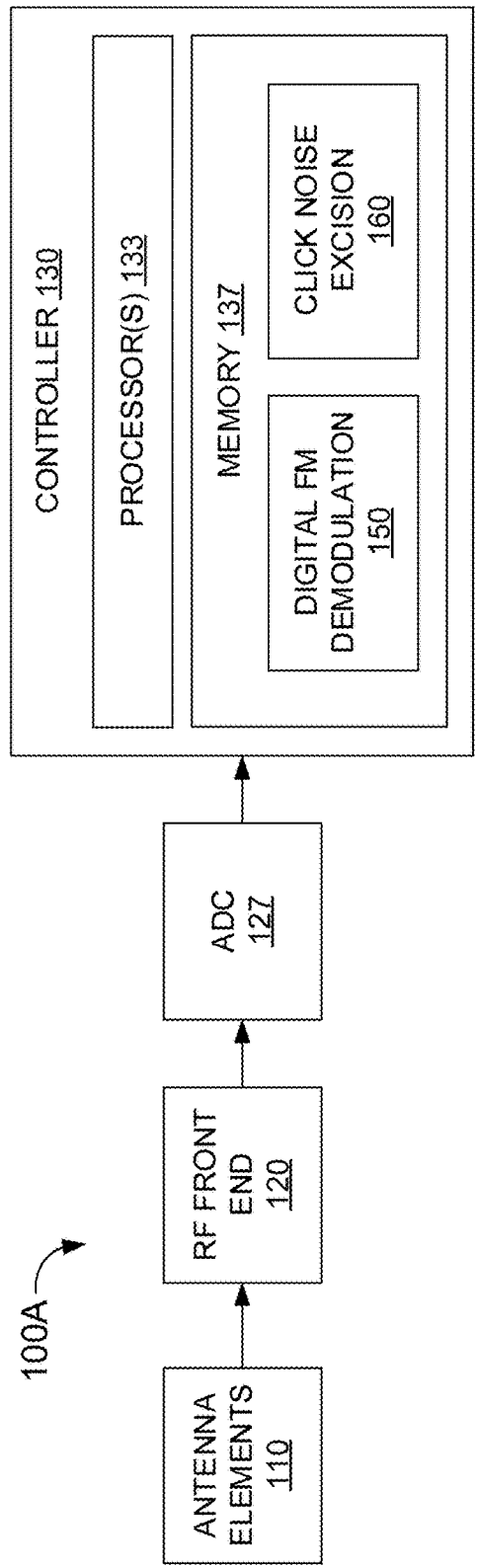
FIG. 1A is a diagram of a radio receiver system implementing digital demodulation, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1 a, 1 b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Radio receivers may introduce non-linear distortion in frequency modulated (FM) signals due to multipath propagation (i.e., radio signals reaching the receiving antenna by two or more paths) and/or low carrier signal to noise ratios. Non-linear distortion may cause problems with linear devices such as equalizers. A traditional approach employs a filter to remove the non-linear distortion. However, a filter may further decrease the carrier signal to noise ratio. To enable the successful operation of linear devices in radio receivers, it is desirable to remove non-linear distortion (i.e., click noise) to discern the information signal from the carrier signal more clearly, and to increase message quality.

Embodiments of the present disclosure are directed to a radio receiver system configured to remove or excise non-linear distortion in a demodulated radio signal. The non-linear distortion may be limited at both the positive voltage amplitudes and the negative voltage amplitudes of the information signal. The present radio receiver system may improve the performance of modern receiver architectures that are limited by operation with legacy analog FM modulators and/or demodulators which may impact the performance of equalizers used with Gaussian minimum shift keying (GMSK) modulation, as an example. The present radio receiver system may implement digital FM demodulation or analog FM demodulation. Digital FM demodulation may entail using digital signal processing (DSP) after conversion of the incoming analog signal to a digital signal by an analog to digital converter (ADC). Alternatively, analog FM demodulation may entail using an analog device such as an FM quadrature demodulator, an FM discriminator, or other FM detector before the conversion of the incoming analog signal to the digital signal.

FIG. 1A is a diagram view of a radio receiver system 100A implementing digital FM demodulation, in accordance with one or more embodiments of the present disclosure. The radio receiver system 100A may include one or more antenna elements 110, a radio frequency (RF) front end 120, and a controller 130.

The one or more antenna elements 110 may be configured to receive one or more incoming radio signals from one or more transmitters remote from the radio receiver system 100. The one or more antenna elements 110 may comprise a single antenna element, or, an antenna system. The RF front end 120 may include one or more bandpass filters (BPFs) configured to filter signals that interfere with the desired incoming signal, one or more low-noise amplifiers (LNAs) configured to amplify the incoming signal without contaminating the incoming signal with noise, one or more local oscillator (LOs) configured to generate an RF signal at an offset from the incoming signal, and one or more mixers configured to mix the incoming signal with the local oscillator signal to convert the signal to an intermediate frequency (IF) signal. After the incoming signal is processed by the RF front end 120, an ADC 127 may convert the incoming analog signal to a digital signal. The incoming digital signal may then be further processed by a controller 130 including one or more processors 133 and a memory 137. The controller 130 may implement modules (e.g., program instructions) stored in the memory 137, including a digital FM demodulation module 150 and a click noise excision module 160.

The one or more processors 133 of the controller 130 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 133 may include any device configured to execute algorithms and/or instructions (e.g., program instructions stored in memory). In one embodiment, the one or more processors 133 may be embodied in an embedded system (for example, as part of a terrestrial vehicle, an aerial vehicle, a marine vehicle, a stationary radio, etc.).

The memory medium 137 may include any storage medium known in the art suitable for storing program instructions executable by the associated one or more processors 133. For example, the memory medium 137 may include a non-transitory memory medium. By way of another example, the memory medium 137 may include, but is not limited to, a read-only memory (ROM), a random-access memory (RAM), a magnetic or optical memory device (e.g., disk), a magnetic tape, a solid-state drive and the like. It is further noted that memory medium 137 may be housed in a common controller housing with the one or more processors 133. In some embodiments, the memory medium 137 may be located remotely with respect to the physical location of the one or more processors 133 and controller 130.

The digital FM demodulation module 150 may be configured to cause the one or more processors 130 to separate the information signal from the carrier signal to generate a demodulated signal (e.g., a frequency-shift-keying waveform). The click noise excision module 160 may be configured to cause the one or more processors 130 to determine measures of the statistical distribution of voltage amplitudes of the demodulated output signal (e.g., over a user-defined time interval). The measures of the statistical distribution may be determined as a mean, a median, a mode, etc.

For example, using the positive voltage mean $\mu_A$ and the negative voltage mean $\mu_B$ (the determined measures of the statistical distribution of the amplitudes), the click noise excision module 160 may further determine a positive voltage threshold for limiting the output signal, and a negative voltage threshold for limiting the output signal. For example, the positive voltage threshold may be defined as a first standard deviation GA greater than the mean $\mu_A$ of positive voltage amplitudes, and the negative voltage threshold may be defined as the first standard deviation GB less than the mean $\mu_B$ of negative voltage amplitudes.

Alternatively, the positive voltage threshold may be defined by a set voltage greater than the mean $\mu_A$, and the negative voltage threshold may be defined by a set voltage less than the mean $\mu_B$. For example, if the positive voltage mean $\mu_A$ is determined to be 0.15 V, and the set voltage is 0.1 V greater than the mean $\mu_A$, the positive threshold may be defined as 0.15 V+0.1V=0.25 V. Likewise, if the negative voltage mean $\mu_B$ is determined to be −0.14 V, and the set voltage is −0.1 V less than the mean $\mu_B$, the negative threshold may be defined as −0.14 V+(−0.1 V)=−0.24 V.

Alternatively, the positive voltage threshold may be defined as greater than the mean $\mu_A$ by a set percentage, and the negative voltage threshold may be defined as less than the mean $\mu_B$ by a set percentage. For example, if the positive voltage mean $\mu_A$ is determined to be 0.1 V, and the set percentage is 50% greater than the mean $\mu_A$, the positive threshold may be defined as 0.1 V*(1.50)=0.15 V. Likewise, if the negative voltage mean $\mu_B$ is determined to be −0.1 V, and the set percentage is 50% less than the mean $\mu_A$, the negative threshold may be defined as −0.1 V*(1.50)=−0.15 V.

Responsive to a portion of the positive voltage amplitudes being greater than the determined positive voltage threshold, the click noise excision module 160 may then clip (e.g., hard limit) the portion of the positive voltage amplitudes greater than the positive voltage threshold from the demodulated output signal. Likewise, responsive to a portion of the negative voltage amplitudes being less than the determined negative voltage threshold, the click noise excision module 160 may clip the portion of the negative voltage amplitudes less than the negative voltage threshold from the demodulated output signal. In other embodiments, the click noise excision module 160 may soft limit (e.g., instead of clip or hard limit) the demodulated output signal.

The excision (e.g., limiting or clipping) of click noise may require analysis of the demodulated output signal during the preamble of known training symbols used for signal detection and synchronization. Analysis may be performed separately for both the positive voltages and the negative voltages of the demodulated output signal. In this way, non-linear distortion may be removed from the digital signal, bit errors in the detection can be reduced, and message quality may be preserved.

After click noise is excised from the demodulated signal (e.g., by the limiting or clipping of the previous steps), the data modulation of the demodulated signal may be detected by Gaussian minimum shift keying (GMSK) detection, frequency-shift keying (FSK) detection, continuous phase modulation (CPM) detection, or minimum shift keying (MSK) detection. The detection may include equalization or other techniques. MSK may entail encoding bits alternating between two components, with the quadrature (Q) component delayed by half the symbol period. MSK may encode each bit as a half sinusoid resulting in a signal having a constant amplitude throughout, which may reduce problems caused by non-linear distortion. An MSK signal may be a continuous-phase frequency-shift keyed (CPFSK) signal with a frequency separation of one-half the bit rate. GMSK may be similar to MSK, however, the digital signal may be shaped with a Gaussian filter before being applied to a frequency modulator.

Figure 1B:
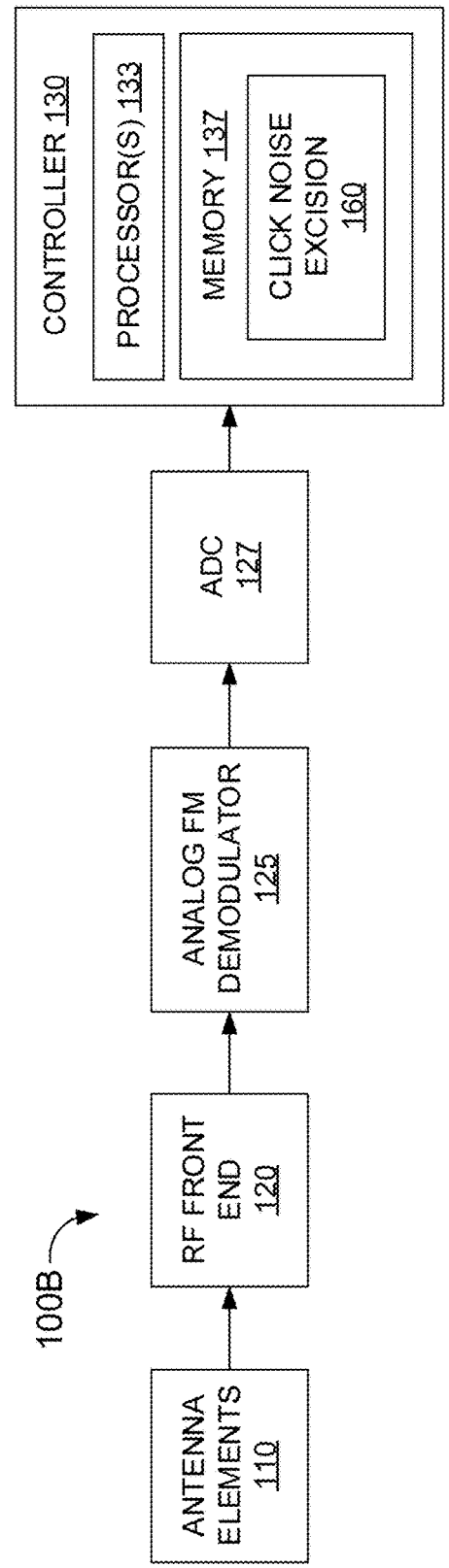
FIG. 1B is a diagram of a radio receiver system implementing analog demodulation, in accordance with one or more embodiments of the present disclosure.

FIG. 1B is a diagram view of a radio receiver system 100B implementing analog FM demodulation, in accordance with one or more embodiments of the present disclosure. The radio receiver system 100B may include one or more antenna elements 110, a radio frequency (RF) front end 120, an analog FM demodulator 125, and a controller 130.

The components of system 100B may be substantially similar to the identically named components of system 100A. However, the FM demodulation of system 100B may be implemented using the analog FM demodulator 125 before the analog incoming signal is converted by the ADC 127 to a digital signal (in contrast to system 100A which employs the digital FM demodulation module 150). In some embodiments, the analog FM demodulator 125 may comprise an FM quadrature demodulator that splits the input signal into an in-phase component and a quadrature component. In other embodiments, the analog FM demodulator 125 may comprise an FM discriminator (e.g., Foster-Seeley discriminator), a ratio detector, etc.

Figure 2:
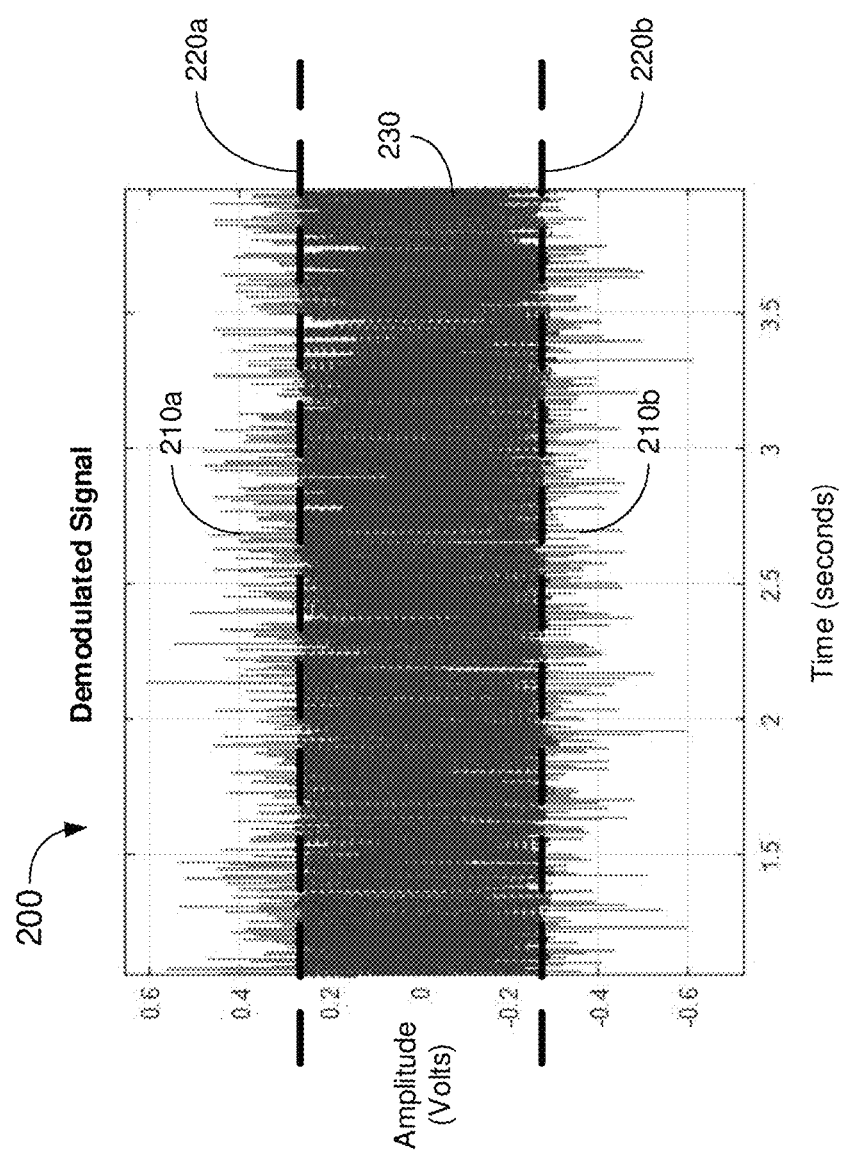
FIG. 2 is a graph illustrating the excision of click noise from a demodulated output signal, in accordance with one or more embodiments of the present disclosure.

FIG. 2 is a graph 200 illustrating the excision of click noise from a demodulated output signal, in accordance with one or more embodiments of the present disclosure. The vertical axis represents amplitude (Volts) and the horizontal axis represents time (seconds). Positive voltage amplitudes 210a greater than a positive voltage threshold 220a are clipped, and likewise, negative voltage amplitudes 210b less than a negative voltage threshold 220 are clipped. The clipped demodulated output signal 230 may then be further processed (e.g., the information encoded therein may be stored in a memory).

In some embodiments, a soft limiting technique may be implemented. As previously described, measures of the statistical distribution of voltage amplitudes of the demodulated output signal may be determined, and respective positive and negative thresholds may be determined. Positive voltage amplitudes greater than the positive threshold [e.g., the first standard deviation GA times the square root of two ($\sqrt{2}$)] are soft limited, and negative voltage amplitudes less than the negative threshold [e.g., the first standard deviation GB times the square root of two ($\sqrt{2}$)] are soft limited. A non-linear soft-limiter may be employed to perform the soft-limiting (e.g., by curving the edges of the crests and troughs of the signal where an otherwise hard limited or clipped signal is flat). It is contemplated herein that the soft limiting technique may be implemented and the performance of the soft limiting technique may be monitored. If an insufficient amount of click noise is removed, other techniques may be progressively used to remove the click noise (for example, a hard limiting or clipping technique).

Figure 3:
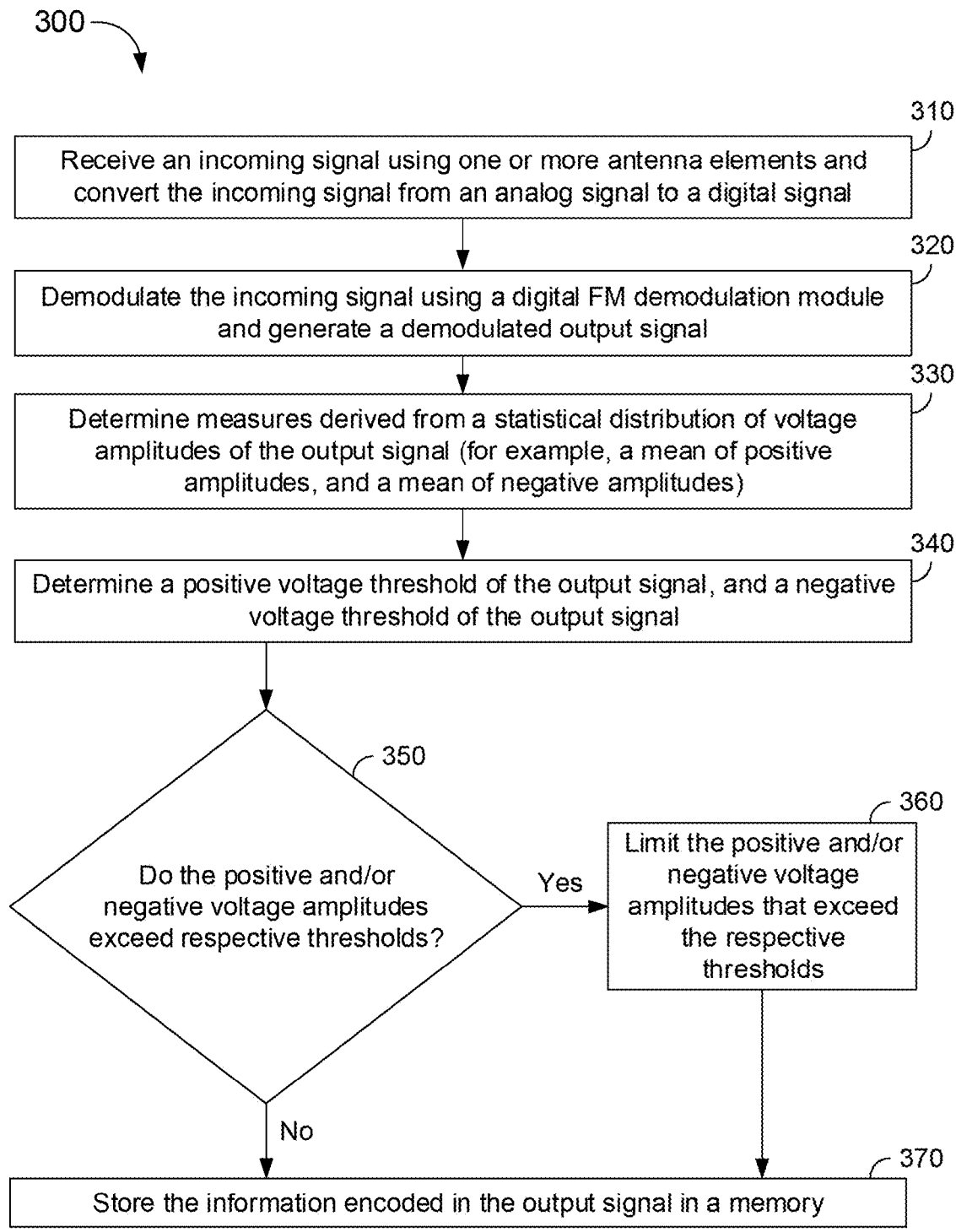
FIGS. 3-4 are flowcharts illustrating methods of excising click noise from a demodulated output signal, in accordance with one or more embodiments of the present disclosure.

FIG. 3 is a flowchart 300 illustrating a method of excising click noise from a demodulated output signal using a digital FM demodulation module, in accordance with one or more embodiments of the present disclosure.

At step 310, an incoming signal may be received using one or more antenna elements. The incoming signal may be converted from an analog signal to a digital signal (e.g., by an ADC). At step 320, the radio signal may be demodulated using a digital FM demodulation module, and a demodulated output signal may be generated. At step 330, a measure of a statistical distribution of positive amplitudes of the output signal may be determined, and a measure of a statistical distribution of negative amplitudes of the output signal may be determined. At step 340, a positive voltage threshold may be determined (e.g., a first standard deviation greater than the mean of positive voltages), and a negative voltage threshold may be determined (e.g., a first standard deviation less than the mean of negative voltages).

At step 350, responsive to a portion of the positive voltage amplitudes being greater than the determined positive voltage threshold and/or responsive to a portion of the negative voltage amplitudes being less than the determined negative voltage threshold, the method may proceed to step 360. Otherwise, the method may proceed to step 370, and the information encoded in the output signal (e.g., to be detected by GMSK, MSK, FSK, or other detection technique) may be stored in a memory without excision of non-linear distortion.

At step 360, the portion of the positive voltage amplitudes may be limited from the output signal, and/or the portion of the negative voltage amplitudes may be limited from the output signal. The method then proceeds to step 370, and the information encoded in the clipped output signal may be stored in a memory. In some embodiments, the information encoded in the output signal may comprise navigation information, weather information, communication information, etc., and may be presented on a display (e.g., to a pilot on a flight display of an aircraft), output from speakers or headphones, etc.

Figure 4:
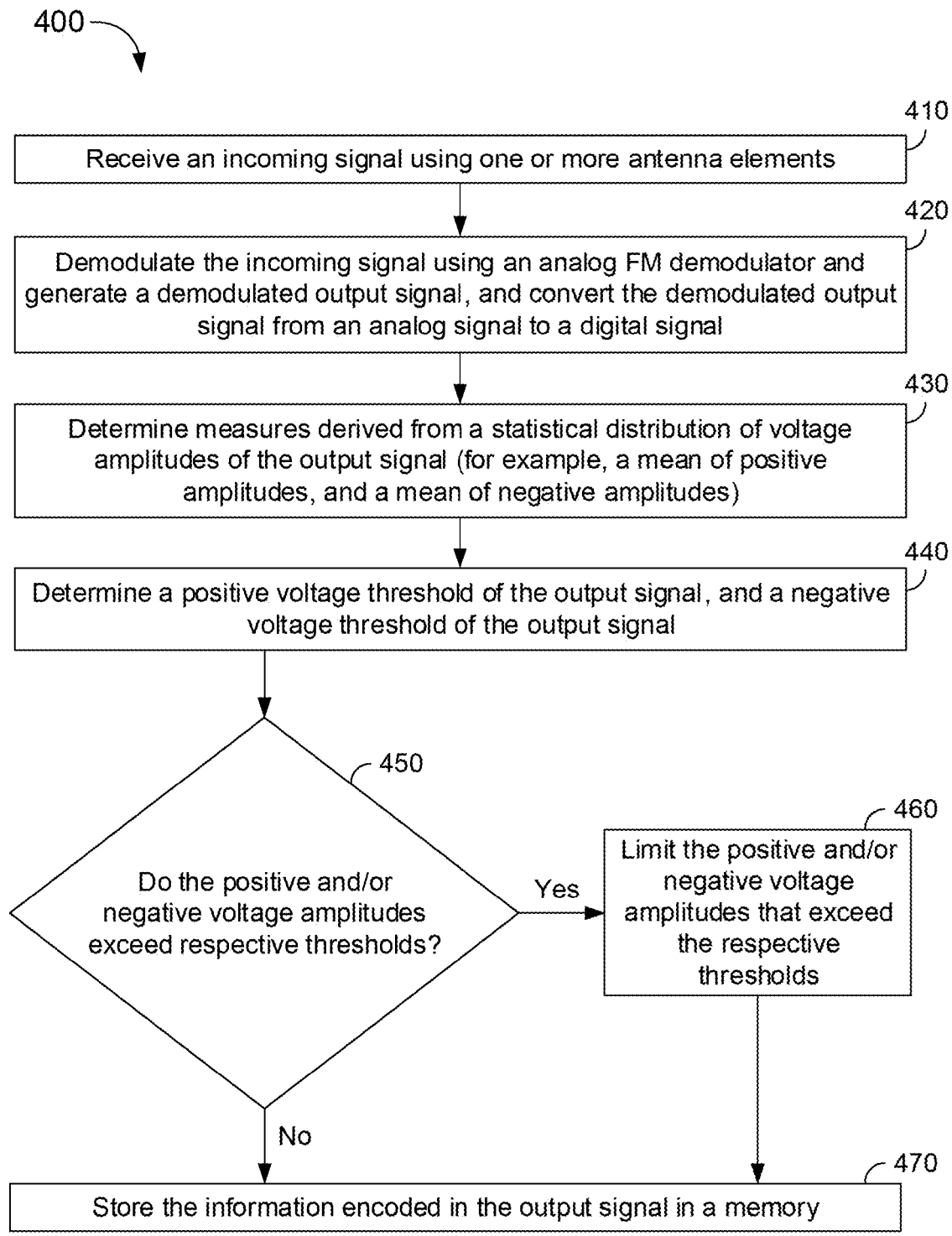

FIG. 4 is a flowchart 400 illustrating a method of excising click noise from a demodulated output signal using an analog FM demodulator, in accordance with one or more embodiments of the present disclosure.

At step 410, an incoming signal may be received using one or more antenna elements. At step 420, the radio signal may be demodulated using an analog FM demodulator, and a demodulated output signal may be generated. The incoming signal may be converted from an analog signal to a digital signal (e.g., by an ADC). At step 430, a measure of a statistical distribution of positive amplitudes of the output signal may be determined, and a measure of a statistical distribution of negative amplitudes of the output signal may be determined. At step 440, a positive voltage threshold may be determined (e.g., a first standard deviation greater than the mean of positive voltages), and a negative voltage threshold may be determined (e.g., a first standard deviation less than the mean of negative voltages).

At step 450, responsive to a portion of the positive voltage amplitudes being greater than the determined positive voltage threshold and/or responsive to a portion of the negative voltage amplitudes being less than the determined negative voltage threshold, the method may proceed to step 460. Otherwise, the method may proceed to step 470, and the information encoded in the output signal (e.g., to be detected by GMSK, MSK, FSK, or other detection technique) may be stored in a memory without excision of non-linear distortion.

At step 460, the portion of the positive voltage amplitudes may be limited from the output signal, and/or the portion of the negative voltage amplitudes may be limited from the output signal. The method then proceeds to step 470, and the information encoded in the clipped output signal may be stored in a memory.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A radio receiver system, comprising:
   one or more antenna elements configured to receive an incoming frequency modulated (FM) signal;
   a controller including one or more processors configured to execute program instructions causing the one or more processors to:
   demodulate the incoming FM signal to generate a demodulated signal;
   determine measures of a statistical distribution of amplitudes of the demodulated signal;
   determine thresholds for limiting the amplitudes of the demodulated signal based on the measures; and
   responsive to portions of the amplitudes exceeding the thresholds, limit the portions of the amplitudes from the demodulated signal.

2. The radio receiver system of claim 1, comprising an analog-to-digital converter (ADC) configured to convert the incoming FM signal from an analog signal to a digital signal.

3. The radio receiver system of claim 2, wherein demodulating the incoming FM signal to generate the demodulated signal comprises:
   demodulating the digital signal by digital FM demodulation.

4. The radio receiver system of claim 1, wherein the one or more processors are configured to further execute program instructions causing the one or more processors to:
   after the portions of the amplitudes are limited from the demodulated signal, detect data modulation of the demodulated signal by at least one of Gaussian minimum shift keying (GMSK) detection, frequency-shift keying (FSK) detection, continuous phase modulation (CPM) detection, or minimum shift keying (MSK) detection.

5. The radio receiver system of claim 1,
   wherein the measures of the statistical distribution of the amplitudes include a mean of positive amplitudes and a mean of negative amplitudes;
   wherein the thresholds include a positive amplitude threshold and a negative amplitude threshold;
   wherein the positive amplitude threshold is determined as a first standard deviation greater than the mean of positive amplitudes, and the negative amplitude threshold is determined as the first standard deviation less than the mean of negative amplitudes.

6. The radio receiver system of claim 1,
   wherein the measures of the statistical distribution of the amplitudes include a mean of positive amplitudes and a mean of negative amplitudes;
   wherein the thresholds include a positive amplitude threshold and a negative amplitude threshold;
   wherein the positive amplitude threshold is determined as a first standard deviation greater than the mean of positive amplitudes times square root of two, and the negative amplitude threshold is determined as the first standard deviation less than the mean of negative amplitudes times square root of two.

7. The radio receiver system of claim 1,
   wherein the measures of the statistical distribution of the amplitudes include a mean of positive amplitudes and a mean of negative amplitudes;
   wherein the thresholds include a positive amplitude threshold and a negative amplitude threshold;
   wherein the positive amplitude threshold is determined as a set voltage greater than the mean of positive amplitudes, and the negative amplitude threshold is determined as the set voltage less than the mean of negative amplitudes.

8. The radio receiver system of claim 1,
   wherein the measures of the statistical distribution of the amplitudes include a mean of positive amplitudes and a mean of negative amplitudes;
   wherein the thresholds include a positive amplitude threshold and a negative amplitude threshold;
   wherein the positive amplitude threshold is determined as greater than the mean of positive amplitudes by a set percentage, and the negative amplitude threshold is determined as less than the mean of negative amplitudes by the set percentage.

9. The radio receiver system of claim 1, wherein limiting the portions of the amplitudes from the demodulated signal comprises hard limiting or clipping.

10. The radio receiver system of claim 1, wherein limiting the portions of the amplitudes from the demodulated signal comprises soft limiting.

11. A radio receiver system, comprising:
    one or more antenna elements configured to receive an incoming frequency modulated (FM) signal;
    an analog FM demodulator configured to demodulate the incoming FM signal and generate a demodulated signal; and
    a controller including one or more processors configured to execute program instructions causing the one or more processors to:
    determine measures of a statistical distribution of amplitudes of the demodulated signal;
    determine thresholds for limiting the amplitudes of the demodulated signal based on the measures; and
    responsive to portions of the amplitudes exceeding the thresholds, limit the portions of the amplitudes from the demodulated signal.

12. The radio receiver system of claim 11, comprising an analog-to-digital converter (ADC) configured to convert the demodulated signal from an analog signal to a digital signal.

13. The radio receiver system of claim 11, wherein the one or more processors are configured to further execute program instructions causing the one or more processors to:
    after the portions of the amplitudes are limited from the demodulated signal, detect data modulation of the demodulated signal by at least one of Gaussian minimum shift keying (GMSK) detection, frequency-shift keying (FSK) detection, continuous phase modulation (CPM) detection, or minimum shift keying (MSK) detection.

14. The radio receiver system of claim 11,
wherein the measures of the statistical distribution of the amplitudes include a mean of positive amplitudes and a mean of negative amplitudes;
wherein the thresholds include a positive amplitude threshold and a negative amplitude threshold;
wherein the positive amplitude threshold is determined as a first standard deviation greater than the mean of positive amplitudes, and the negative amplitude threshold is determined as the first standard deviation less than the mean of negative amplitudes.

15. The radio receiver system of claim 11,
wherein the measures of the statistical distribution of the amplitudes include a mean of positive amplitudes and a mean of negative amplitudes;
wherein the thresholds include a positive amplitude threshold and a negative amplitude threshold;
wherein the positive amplitude threshold is determined as a first standard deviation greater than the mean of positive amplitudes times square root of two, and the negative amplitude threshold is determined as the first standard deviation less than the mean of negative amplitudes times square root of two.

16. The radio receiver system of claim 11,
wherein the measures of the statistical distribution of the amplitudes include a mean of positive amplitudes and a mean of negative amplitudes;
wherein the thresholds include a positive amplitude threshold and a negative amplitude threshold;
wherein the positive amplitude threshold is determined as a set voltage greater than the mean of positive amplitudes, and the negative amplitude threshold is determined as the set voltage less than the mean of negative amplitudes.

17. The radio receiver system of claim 11,
wherein the measures of the statistical distribution of the amplitudes include a mean of positive amplitudes and a mean of negative amplitudes;
wherein the thresholds include a positive amplitude threshold and a negative amplitude threshold;
wherein the positive amplitude threshold is determined as greater than the mean of positive amplitudes by a set percentage, and the negative amplitude threshold is determined as less than the mean of negative amplitudes by the set percentage.

18. The radio receiver system of claim 11, wherein limiting the portions of the amplitudes from the demodulated signal comprises hard limiting or clipping.

19. The radio receiver system of claim 11, wherein limiting the portions of the amplitudes from the demodulated signal comprises soft limiting.

* * * * *